United States Patent
Miyata

(10) Patent No.: US 9,008,533 B2
(45) Date of Patent: Apr. 14, 2015

(54) PROCESSING APPARATUS, IMAGE FORMING APPARATUS, PROCESSING METHOD AND COMPUTER READABLE INFORMATION RECORDING MEDIUM

(71) Applicant: Yushi Miyata, Tokyo (JP)

(72) Inventor: Yushi Miyata, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 13/909,216

(22) Filed: Jun. 4, 2013

(65) Prior Publication Data

US 2014/0010565 A1    Jan. 9, 2014

(30) Foreign Application Priority Data

Jul. 3, 2012 (JP) .................................. 2012-149647
Apr. 12, 2013 (JP) .................................. 2013-083538

(51) Int. Cl.
G03G 15/00 (2006.01)
H02J 4/00 (2006.01)
H02J 1/14 (2006.01)
H02J 9/06 (2006.01)

(52) U.S. Cl.
CPC . G03G 15/80 (2013.01); H02J 4/00 (2013.01); G03G 15/5004 (2013.01); H02J 1/14 (2013.01); H02J 9/06 (2013.01)

(58) Field of Classification Search
None
See application file for complete search history.

(56) References Cited

FOREIGN PATENT DOCUMENTS

| JP | 2001-253152 | 9/2001 | |
| JP | 2007-171741 | 7/2007 | |
| JP | 2007-171741 A | * 7/2007 | ............. G03G 21/00 |

* cited by examiner

*Primary Examiner* — Clayton E LaBalle
*Assistant Examiner* — Jas Sanghera
(74) *Attorney, Agent, or Firm* — Oblon, McClelland, Maier & Neustadt, L.L.P.

(57) ABSTRACT

A processing apparatus that an uninterruptible power supply system supplies power to and carries out a process. The processing apparatus includes an electric energy amount determination part that determines, based on a charged amount of electric energy in the uninterruptible power supply system, an amount of maximum electric energy that the uninterruptible power supply system can supply; and a function selection part that selects, depending on the amount of maximum electric energy, functions that can be used for carrying out the process.

12 Claims, 6 Drawing Sheets

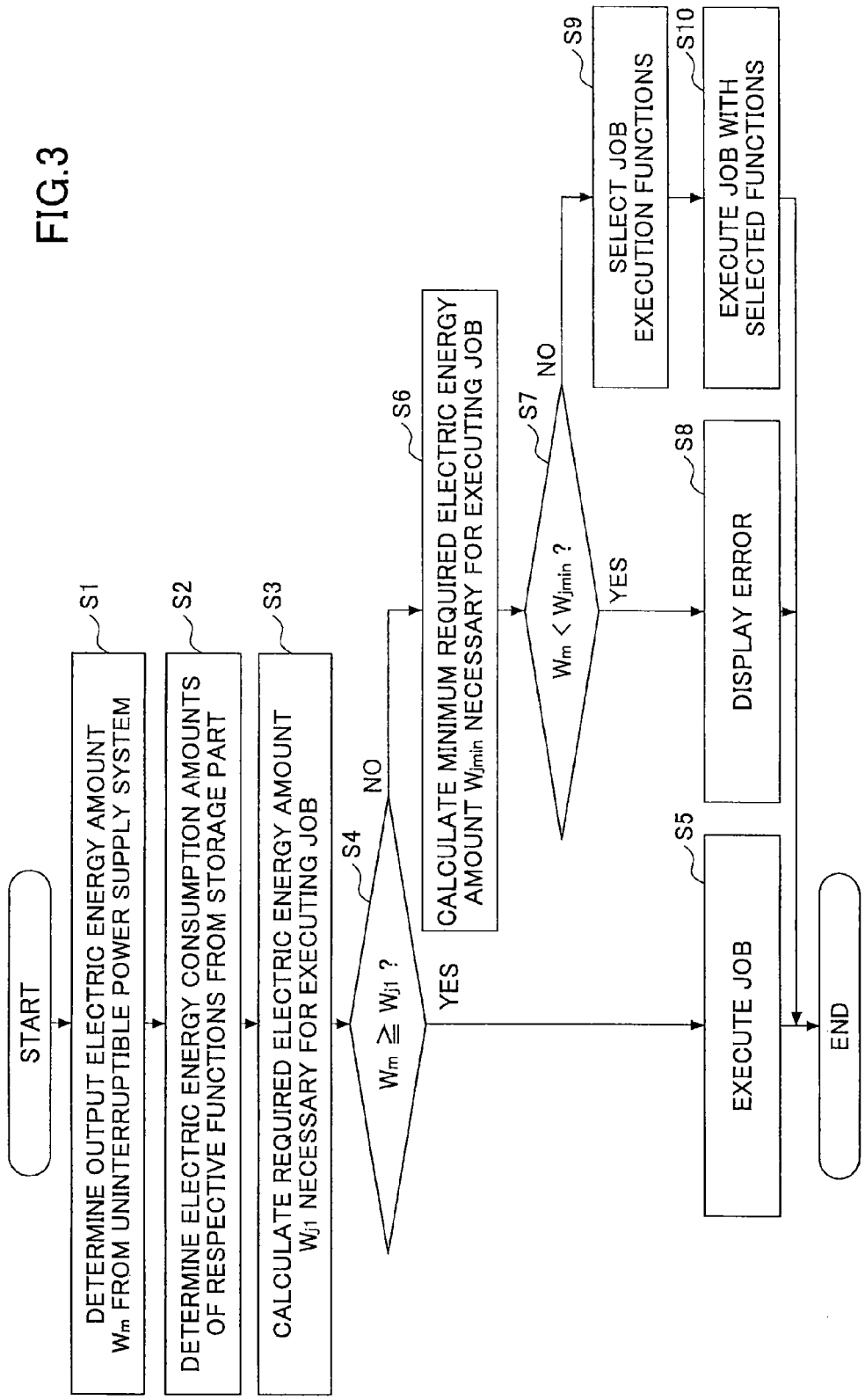

FIG.4

| FUNCTION | AMOUNT OF REQUIRED ELECTRIC ENERGY |
|---|---|
| PERIPHERAL DEVICE A | 50 Wh |
| PERIPHERAL DEVICE B | 30 Wh |
| STAPLING | 15 Wh |
| PUNCHING | 5 Wh |
| FIXING HEATER A | 800 Wh |
| FIXING HEATER B | 400 Wh |
| DC ELECTRIC ENERGY CONSUMPTION | 450 Wh |

FIG.5

| HEATER MAXIMUM REQUIRED ELECTRIC ENERGY AMOUNT | PAPER FEEDING SPEED (ppm) | |
|---|---|---|
| | A4 LONGITUDINAL | A4 LATERAL |
| 550 Wh | 40 | – |
| 600 Wh | 45 | – |
| 650 Wh | 50 | – |
| 700 Wh | 50 | – |
| 750 Wh | 50 | 35 |
| 800 Wh | 50 | 40 |
| 850 Wh | – | 45 |
| 900 Wh | – | 50 |
| 950 Wh | – | 50 |
| 1000 Wh | – | 50 |
| 1050 Wh | – | 50 |
| 1100 Wh | – | 50 |
| 1150 Wh | – | 50 |
| 1200 Wh | – | 50 |

PROCESSING APPARATUS, IMAGE FORMING APPARATUS, PROCESSING METHOD AND COMPUTER READABLE INFORMATION RECORDING MEDIUM

BACKGROUND OF THE INVENTION

1. Field of the Invention

The present invention relates to a processing apparatus, an image forming apparatus, a processing method and a computer readable information recording medium.

2. Description of the Related Art

Generally speaking, an image forming apparatus such as a printer, a copier or the like operates with the power supplied by the commercial power source or the like, and prints and outputs an image onto a recording medium. In this regard, an uninterruptible power supply (UPS) system may be used for maintaining the functions of the image forming apparatus even after the power supply from the commercial power source or so has been stopped.

However, since relatively large power is required for printing an image onto a recording medium, it may be difficult to use all the functions of the image forming apparatus with the power supplied by the uninterruptible power supply system.

An image forming apparatus has been disclosed (for example, see Japanese Laid-Open Patent Application No. 2007-171741, for example), in which, in a case where the power is supplied from an uninterruptible power supply system after the power supply from the commercial power source or the like has been stopped, available functions are limited for the purpose of keeping the uninterruptible power supply system supplying the power for a long time.

However, according to the image forming apparatus of Japanese Laid-Open Patent Application No. 2007-171741, the power supply to an image forming mechanism part from the uninterruptible power supply system may be stopped after the power supply from the commercial power source or the like has been stopped, and thus, it may be impossible to carry out printing while the uninterruptible power supply system is used to supply the power. Then, if printing is forcibly carried out while the uninterruptible power supply system is used to supply the power, the electric energy required by the image forming apparatus to carry out the printing may exceed the maximum electric energy that the uninterruptible power supply system can supply, and thus, the uninterruptible power supply system may be stopped.

SUMMARY OF THE INVENTION

According to one embodiment of the present invention, a processing apparatus that an uninterruptible power supply system supplies power to and carries out a process includes an electric energy amount determination part that determines, based on a charged amount of electric energy in the uninterruptible power supply system, an amount of maximum electric energy that the uninterruptible power supply system can supply; and a function selection part that selects, depending on the amount of maximum electric energy, functions that can be used for carrying out the process.

Other objects, features and advantages of the present invention will become more apparent from the following detailed description when read in conjunction with the accompanying drawings.

BRIEF DESCRIPTION OF THE DRAWINGS

FIG. 3 illustrates a flowchart of a printing process of the image forming apparatus according to the first embodiment;

FIG. 4 illustrates a table of amounts of electric energy consumptions of respective functions stored by the storage part of the image forming apparatus according to the first embodiment;

FIG. 5 illustrates a table of amounts of electric energy consumptions of fixing heaters for respective paper feeding directions and respective paper feeding speeds stored by the storage part of the image forming apparatus according to the first embodiment.

DETAILED DESCRIPTION OF THE EMBODIMENT

Below, the embodiment will be described. As one example of a processing apparatus according to the first embodiment, an image forming apparatus will be described. However, the present invention can be applied to processing apparatuses including the image forming apparatus, each of which is an apparatus to which the power is supplied by an uninterruptible power supply system.

<Configuration of Image Forming Apparatus>

Figure 1:
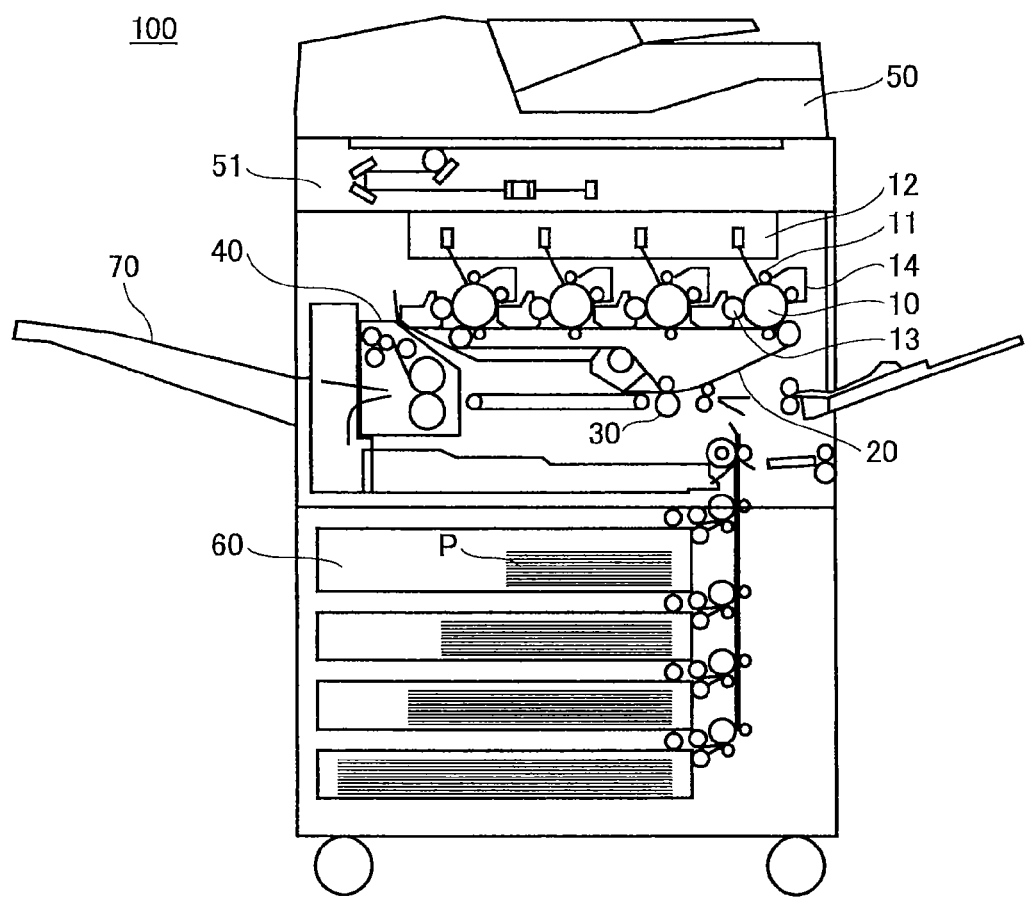
FIG. 1 illustrates a general configuration of an image forming apparatus according to a first embodiment.

A general configuration of an image forming apparatus 100 according to the first embodiment will be described based on FIG. 1.

The image forming apparatus 100 includes photosensitive members 10, electrification units 11, an exposure unit 12, development units 13, an intermediate transfer belt 20, a secondary transfer roller 30, a fixing unit 40, an automatic document feeder (ADF) 50 and a reading unit 51. The image forming apparatus 100 is a multifunction peripheral (MFP) that includes a plurality of development parts that respectively include the photosensitive members 10, the electrification units 11, the development units and so forth for forming respective toner images of different colors, prints a color image on a sheet of paper P as a recording medium contained in a paper tray 60, and thus, outputs the color image.

In the image forming apparatus 100, in a case of printing an image on a sheet of paper P, first the electrification units 11 uniformly electrify surfaces of the photosensitive members 10 that are being rotated, respectively. Further, the reading unit 51 reads an image from an original document that is set on the ADF 50, for example. Then, the exposure unit 12 forms electrostatic latent images on the surfaces of the photosensitive members 10, respectively, by exposing them based on image data of the draft document from which the image has been thus read by the reading unit 51. Next, the development units 13 containing inside developers including toners, respectively, develop the electrostatic latent images formed on the surfaces of the photosensitive members 10 and form toner images, respectively. The plurality of development parts that the image forming apparatus 100 have thus form the respective toner images of the different colors, respectively, and then, respectively transfer the toner images onto the intermediate transfer belt 20 that is being rotated in a manner of being superposed each other.

The toner images thus transferred onto the intermediate transfer belt 20 is secondarily transferred onto the sheet of paper P, conveyed by a conveyance unit from the paper tray 60, at a secondary transfer part between the intermediate transfer belt 20 and the secondary transfer roller 30. The sheet of paper P onto which the toner images have been thus transferred is then conveyed, and is ejected to an ejection tray 60 in such a state that the toner images have been fixed as a result of being heated and pressed in the fixing unit 40.

By cleaning units 14, transfer residual toners are removed from the surfaces of the photosensitive members 10 from which the toner images have been thus transferred onto the intermediate transfer belt 20, respectively, and the photosensitive members 10 are thus prepared for a subsequent process of forming an image.

Further, the image forming apparatus 100 includes, as peripheral devices, a large-capacity paper supply tray and a finisher that carries out a post-process(es) such as stapling, punching and/or the like.

<Functions of Image Forming Apparatus>

Figure 2A:
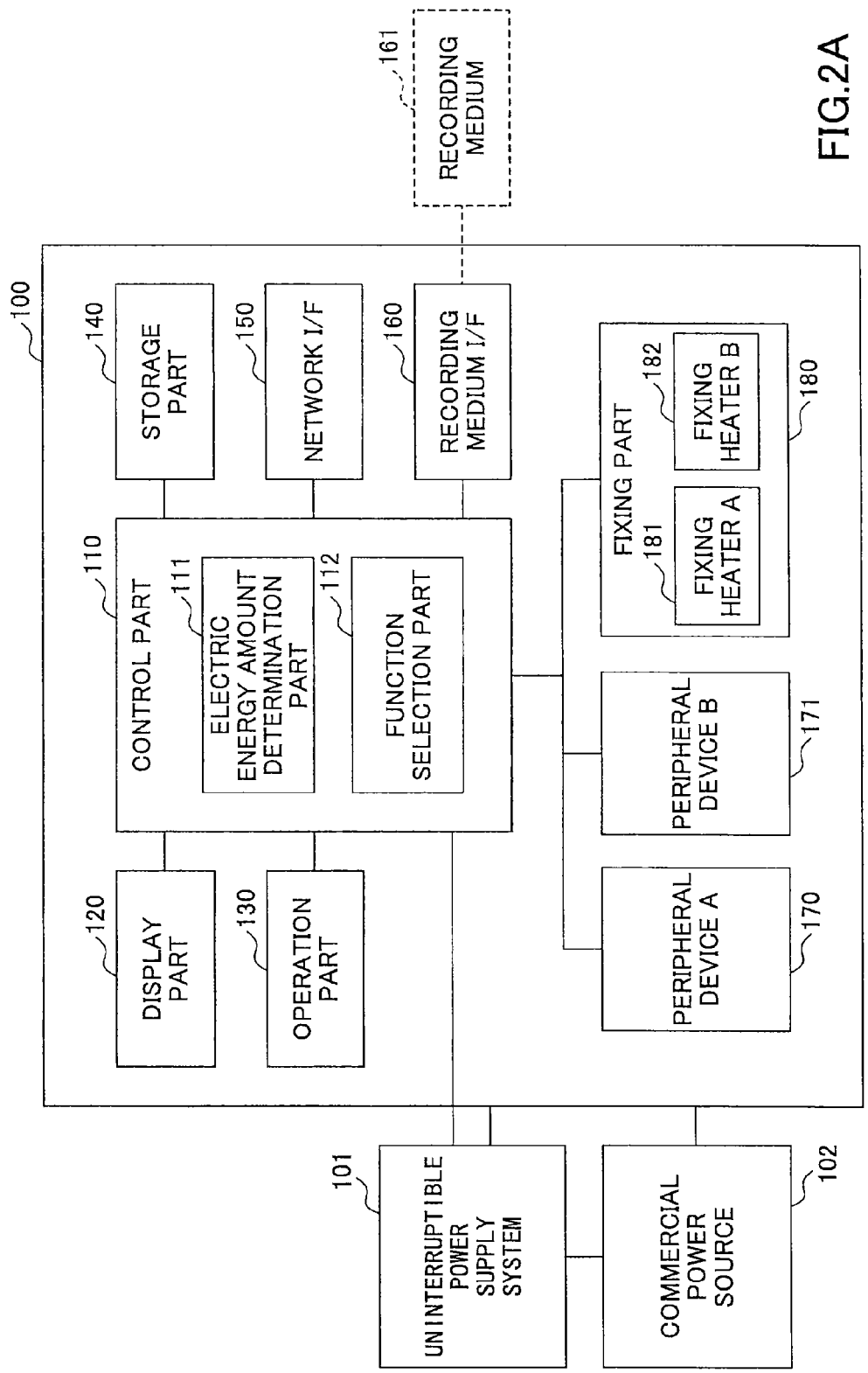
FIG. 2A is a block diagram illustrating a functional configuration of the image forming apparatus according to the first embodiment.

FIG. 2A is a block diagram illustrating a functional configuration of the image forming apparatus 100.

As shown in FIG. 2A, the image forming apparatus 100 has a control part 110, a display part 120, an operation part 130, a storage part 140, a network I/F 150, a recording medium I/F 160, the peripheral device A 170, the peripheral device B 171 and a fixing part 180. The image forming apparatus 100 carries out a process such as a printing process with the power supplied by a commercial power source 102. At a time the power supply from the commercial power source 102 has been stopped, the image forming apparatus 100 carries out a process such as a printing process with the power supplied by an uninterruptible power supply (UPS) system 101. It is noted that the uninterruptible power supply system 101 may be one that the image forming apparatus 100 has built-in.

Figure 2B:
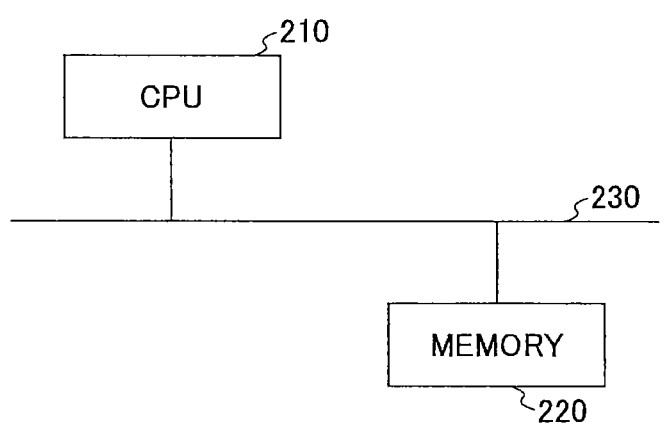
FIG. 2B is a block diagram of a part of the image forming apparatus according to the first embodiment corresponding to a control part and a storage part shown in FIG. 2A.

The control part 110 controls operations of the image forming apparatus 100 by reading a program(s) and data from the storage part 140 and carrying out processes. That is, as shown in FIG. 2B, the image forming apparatus 100 has a CPU 210 and a memory 220 which are connected by a bus 230, the CPU 210 corresponds to the control part 110, the memory 220 corresponds to the storage part 140, and thus, the CPU 210 controls the operations of the image forming apparatus 100 by reading the program(s) and data from the memory 220 and carrying out the processes. It is noted that FIG. 2B shows only the part of the image forming apparatus 100 corresponding to the control part 110 and the storage part 140. The control part 110 has an electric energy amount determination part 111 and a function selection part 112 each of which is realized as a result of the CPU 210 executing the program(s) read from the memory 220.

The electric energy amount determination part 111 determines the amount of maximum electric energy that the uninterruptible power supply system 101 can output. The function selection part 112 selects functions that can be used according to the amount of maximum electric energy determined by the electric energy amount determination part 111, when the image forming apparatus 100 is to carry out a process using the power supplied by the uninterruptible power supply system 101.

The functions that the image forming apparatus 100 has include, for example, a printing function, a scanner function, a facsimile (FAX) function, respective functions of the peripheral device A 170 and stapling, punching and/or the like of the peripheral device B 171. The function selection part 112 selects functions, necessary to carry out the process that is to be carried out according to an input instruction, from among the various functions that the image forming apparatus 100 has. Selecting the functions includes, for example, selecting conditions of use for the respective functions such as a paper feeding speed, a paper feeding direction and/or the like concerning the printing function.

The display part 120 and/or the operation part 130 have, for example, key switches (hardware keys) and a liquid crystal display (LCD) having a touch panel function (including software keys of a graphical user interface (GUI)), and thus, are a display and/or input device(s) that function(s) as a user interface (UI) used when the functions that the image forming apparatus 100 has are to be used.

The storage part 140 includes, for example, a hard disk drive (HDD) and/or a read-only memory (ROM) as a non-volatile storage device storing a program(s) and/or data, a volatile random access memory (RAM) temporarily storing a program(s) and/or data, and/or the like.

The network I/F 150 is an interface between an apparatus having a communication function and the image forming apparatus 100 via a network such as a local area network (LAN), a wide area network (WAN) or the like configured by data transmission lines such as wired and/or wireless lines.

The recording medium I/F 160 is an interface with a recording medium. The image forming apparatus 100 can carry out reading information from and/or writing information to a recording medium 161 via the recording medium I/F 160. Specific examples of the recording medium 161 include a flexible disk, a compact disc (CD), a digital versatile disc (DVD), a SD memory card, and a universal serial bus (USB) memory.

The peripheral device A 170 is the large-capacity paper supply tray provided in the image forming apparatus 100. The peripheral device B 171 is the finisher that carries out the post-process(es) such as stapling, punching, and/or the like.

The fixing part 180 corresponds to the above-mentioned fixing unit 40, and fixes a toner image(s) onto a sheet of paper P by heating and pressing the sheet of paper P that has been conveyed in the state of having the toner image(s) transferred thereonto. The fixing part 180 includes a fixing heater A 181 and a fixing heater B 182. The fixing heater A 181 heats a central part along the width direction (lateral direction) of the sheet of paper P that has been conveyed into the fixing part 180. The fixing heater B 182 heats two end parts along the width direction (lateral direction) of the sheet of paper P that has been conveyed into the fixing part 180.

In the fixing part 180, the sheet of paper P is heated by the fixing heater A 181 or both of the fixing heater A 181 and the fixing heater B 182 depending on the size and the paper feeding direction of the sheet of paper P that has been conveyed into the fixing part 180. For example, in a case where the sheet of paper P of A4 size has been conveyed in a longitudinal direction ("conveying longitudinally"), the sheet of paper P is heated only using the fixing heater A 181 of the fixing part 180. In a case where the sheet of paper P of A4 size has been conveyed in a lateral direction ("conveying laterally"), the sheet of paper P is heated using both the fixing heater A 181 and the fixing heater B 182 of the fixing part 180.

It is noted that "conveying longitudinally" means that the sheet of paper P is conveyed in such a manner that the longitudinal direction of the sheet of paper P is coincident with the conveyance direction of the sheet of paper P. On the other hand, "conveying laterally" means that the sheet of paper P is conveyed in such a manner that the longitudinal direction of the sheet of paper P is perpendicular to the conveyance direction of the sheet of paper P.

In the case where the sheet of paper has been conveyed in the longitudinal direction ("conveying longitudinally"), the shorter side of the sheet of paper P faces the fixing part 180, and thus, heating of the sheet of paper P is carried out for the shorter width at the same time. Thus, only the fixing heater A 181 of the fixing part 180 is used. On the other hand, in the case where the sheet of paper P has been conveyed in the lateral direction ("conveying laterally"), the longer side of the sheet of paper P faces the fixing part 180, and thus, heating of the sheet of paper P is carried out for the longer width at the same time. Thus, both the fixing heater A 181 and the fixing heater B 182 of the fixing part 180 are used.

It is noted that, as mentioned above using FIG. 1, the image forming apparatus 100 has the other functional parts such as the photosensitive members 10, electrification units 11, exposure unit 12, development units 13, intermediate transfer belt 20, secondary transfer roller 30, automatic document feeder (ADF) 50 and reading unit 51.

<Job Execution in Image Forming Apparatus>

Next, a process will be described for when the image forming apparatus 100 executes a job such as printing while receiving the power supplied by the uninterruptible power supply system 101.

FIG. 3 illustrates a flow of operations of a printing process carried out by the image forming apparatus 100 according to the first embodiment.

When the image forming apparatus 100 is to execute a job such as printing while receiving the power supplied by the uninterruptible power supply system 101, first the electrical energy amount determination part 111 determines the amount of maximum electric energy Wm that the uninterruptible power supply system 101 can output, in step S1. It is noted that it is also possible that the electric energy amount determination part 111 determines the amount of maximum electric energy Wm of the uninterruptible power supply system 101 after an instruction for executing the job has been input to the image forming apparatus 100 and before the job is executed. Further, it is also possible that the electric energy amount determination part 111 has periodically determined the amount of maximum electric energy Wm of the uninterruptible power supply system 101 while no job is executed, and the amount of maximum electric energy Wm thus determined is used when a job is executed thereafter.

Next, in step S2, the function selection part 112 determines the amounts of electric energy consumptions of the respective functions that the image forming apparatus 100 has from the storage part 140. In the storage part 140, the amounts of electric energy to be consumed at a time of use are stored for the respective ones of the plurality of functions that the image forming apparatus 100 has.

FIG. 4 illustrates a table of the amounts of electric energy consumptions of the respective functions of the image forming apparatus 100 stored in the storage part 140. As shown in FIG. 4, in the storage part 140, the amounts of electric energy to be consumed when the peripheral device A 170 and the peripheral device B 171 are used, respectively, are stored ("Peripheral Device A", "Peripheral Device B"). Further, in the storage part 140, the amounts of electric energy to be consumed when stapling and punching are carried out in the peripheral device B 171, respectively, are stored ("Stapling", "Punching"). Further, in the storage part 140, the amounts of electric energy to be consumed when the fixing heater A 181 and the fixing heater B 182 are used, respectively, are stored ("Fixing Heater A", "Fixing Heater B"). Further, in the storage part 140, the amount of electric energy to be consumed when printing is carried out (without including those consumed when using any one of the fixing part 180, the peripheral device A 170 and the peripheral device 171) is stored ("DC Electric Energy Consumption"). These amounts of electric energy are stored in the storage part 140 in a form of a table. It is noted that the values shown in FIG. 4 are, for example, those assuming that a color image is printed onto a sheet of paper P of A4 size.

Further, as shown in FIG. 5, in the storage part 140, a table of amounts of electric energy consumptions for respective conditions of the fixing heater A 181 and the fixing heater B 182 of the fixing part 180 with respect to the paper feeding speed and the paper feeding direction of a sheet of paper P is stored. As shown in FIG. 5, as the paper feeding speed of a sheet of paper P is increased, the amount of maximum electric energy consumed by the fixing heater increases. Further, for example, the amount of electric energy consumption is smaller for the case of feeding A4 paper in the longitudinal direction ("A4 Longitudinal") since only the fixing heater A 181 is used as mentioned above. In contrast thereto, the amount of electric energy consumption is larger for the case of feeding A4 paper in the lateral direction ("A4 Lateral") since also the fixing heater B 182 is used in addition to the fixing heater A 181.

After the tables of FIGS. 4 and 5, for example, have been thus obtained from the storage part 140, the function selection part 112 calculates an amount of required electric energy Wj1 necessary for carrying out the job, the instruction for which has been input to the image forming apparatus 100, in step S3. The function selection part 112 calculates an amount of required electric energy Wj1 necessary for carrying out the job from the tables stored in the storage part 140 based on the contents of the job such as the size of the sheet(s) of paper P, the paper feeding direction and the paper feeding speed, including the processes to be carried out using the peripheral device A 170 and the peripheral device B 171, and/or the like. It is noted that the tables stored in the storage part 140 may be changed appropriately in suitable timing through setting operations using the display part 120 and the operation part 130 according to the set conditions of the peripheral devices and/or the like that the image forming apparatus 100 has. Further, the respective tables may be downloaded through a network to which the image forming apparatus 100 is connected and then be stored in the storage part 140.

Next, in step S4 of FIG. 3, the function selection part 112 compares the amount of maximum electric energy Wm that the electric energy amount determination part 111 has determined in step S1 and the thus calculated amount of required electric energy Wj1 necessary for executing the job.

In a case where, in step S4, the amount of required electric energy Wj1 necessary for executing the job is less than or equal to the amount of maximum electric energy Wm of the uninterruptible power supply system 101 (step S4 YES), the image forming apparatus 100 executes the job in step S5, and finishes the process.

On the other hand, in a case where, in step S4, the amount of required electric energy Wj1 necessary for executing the job is greater than the amount of maximum electric energy Wm of the uninterruptible power supply system 101 (step S4 NO), the function selection part 112 calculates an amount of minimum required electric energy Wjmin necessary for executing the job in step S6.

The amount of minimum required electric energy Wjmin is the amount of minimum required electric energy for printing an image(s) on a sheet(s) of paper P concerning the job, the instruction for which has been input to the image forming apparatus 100. For example, in a case where the job has the contents such that a sheet(s) of paper P of A4 size is(are) conveyed laterally ("conveying laterally") and printing is carried out, first it is possible to reduce the amount of electric energy to be consumed by the fixing part 180 by changing the paper feeding direction from "conveying laterally" ("A4 Lateral") into "conveying longitudinally" ("A4 Longitudinal"), as can be seen from FIG. 5. Second, it is possible to further reduce the amount of electric energy to be consumed by the fixing part 180 by reducing the paper feeding speed, as can be seen from FIG. 5.

Furthermore, it is also possible to reduce the amount of electric energy to be consumed, by changing the supply source of the sheet(s) of paper P from the peripheral device A 170 to the paper tray 60 included in the body of the image forming apparatus 100 and changing the ejection destination of the sheet(s) of paper P from the peripheral device B 171 to the ejection tray 70 included in the body of the image forming apparatus 100 so as avoid using the peripheral device A 170 and the peripheral device B 171.

Thus, the function selection part 112 calculates, based on the tables stored in the storage part 140, the amount of minimum required electric energy Wjmin that is estimated as the minimum required in a case where printing is carried out using the minimum functions required for printing an image(s) onto a sheet(s) of paper P concerning the job.

Next, in step S7 of FIG. 3, the function selection part 112 compares the amount of maximum electric energy Wm that electric energy amount determination part 111 has determined in step S1 and the thus calculated amount of minimum required electric energy Wjmin.

In a case where, in step S7, the amount of minimum required electric energy Wjmin that the function selection part 112 has thus calculated in step S6 is greater than the amount of maximum electric energy Wm that electric energy amount determination part 111 has determined in step S1, the function selection part 112 displays on the display part 120 an error message indicating that execution of the job is impossible, in step S8, and the process is finished.

On the other hand, in a case where, in step S7, the amount of minimum required electric energy Wjmin that the function selection part 112 has calculated in step S6 is less than or equal to the amount of maximum electric energy Wm that electric energy amount determination part 111 has determined in step S1, the function selection part 112 selects the functions for executing the job, in step S9.

That is, in step S9, the function selection part 112 calculates an amount of required electric energy Wj2 to be consumed for a case of, for example, increasing the paper feeding speed, in such a manner that the functions thus selected approach the functions originally required by the job, the instruction for which has been input, from the functions concerning the amount of minimum required electric energy Wjmin calculated in step S6. Further, the function selection part 112 calculates the amount of required electric energy Wj2 to be consumed for a case of, in addition to or instead of thus increasing the paper feeding speed, changing (increasing) the paper feeding direction, and/or using the peripheral device A 170 and/or the peripheral device B 171. The function selection part 112 thus selects and adds the function(s) to those to be used for carrying out the job, in such a manner that the thus calculated amount of required electric energy Wj2 to be consumed does not exceed the amount of maximum electric energy Wm that the uninterruptible power supply system 101 can output.

Figure 6:
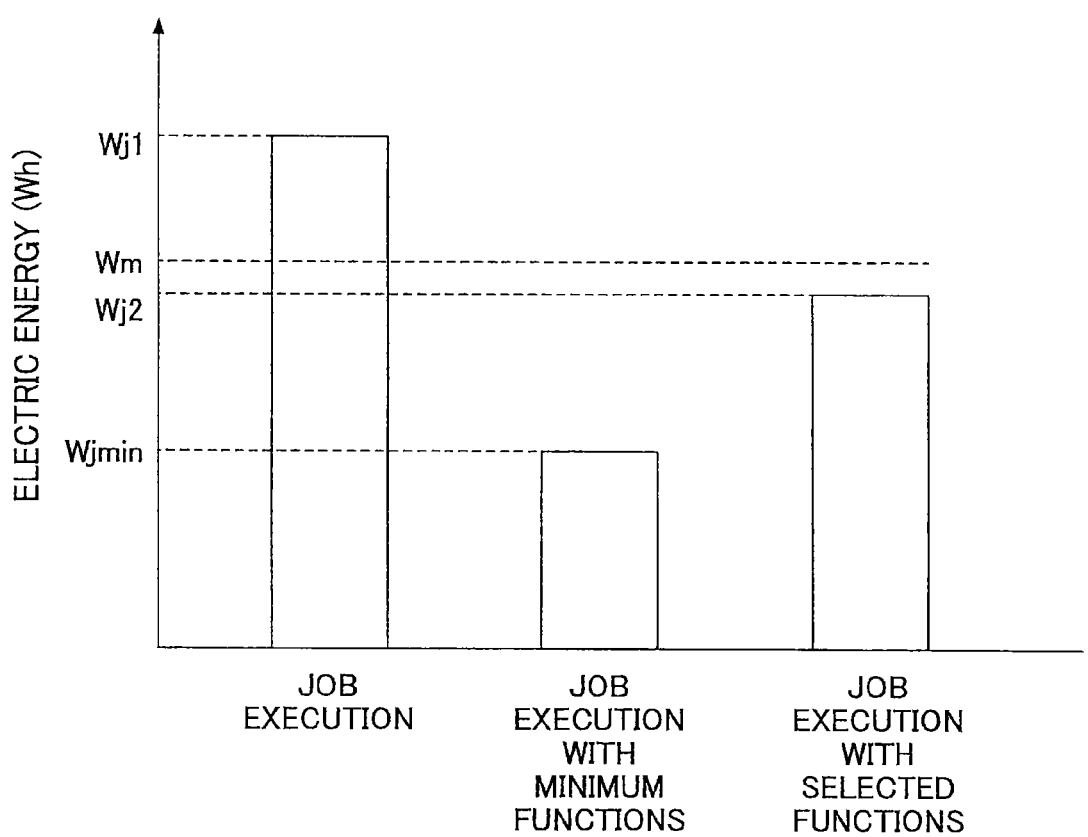
FIG. 6 illustrates amounts of electric energy consumptions at a time of executing a job in the image forming apparatus according to the first embodiment.

FIG. 6 illustrates amounts of electric energy consumptions at a time of execution of a job in the image forming apparatus 100 according to the first embodiment. FIG. 6 shows an amount of required electric energy Wj1 for a case of executing a job with the functions required by the job, the instruction for which has been input to the image forming apparatus 100. FIG. 6 also shows an amount of minimum required electric energy Wjmin necessary for executing the job. FIG. 6 further shows an amount of required electric energy Wj2 necessary for executing the job with functions and conditions selected by the function selection part 112. FIG. 6 further shows an amount of maximum electric energy Wm that the uninterruptible power supply system 101 can output.

As shown in FIG. 6, in a case where an amount of required electric energy Wj1 necessary for executing a job, an instruction for which has been input to the image forming apparatus 100, is greater than an amount of maximum electric energy Wm of the uninterruptible power supply system 101, and also an amount of minimum required electric energy Wjmin necessary for executing the job is less than or equal to the amount of maximum electric energy Wm of the uninterruptible power supply system 101, the function selection part 112 selects functions and conditions to be used when executing the job in such a manner that the amount of required electric energy Wj2 to be consumed when executing the job does not exceed the amount of maximum electric energy Wm of the uninterruptible power supply system 101. Thus, the image forming apparatus 100 can execute a job effectively using electric energy that the uninterruptible power supply system 101 can supply, without completely consuming the electric energy of the uninterruptible power supply system 101 resulting in a stoppage of the uninterruptible power supply system 101, by executing the job with selected functions and conditions.

Returning to the description of the flowchart of FIG. 3, after the function selection part 112 thus selects the functions and conditions to be used for executing the job in the above-mentioned manner in step S9, the image forming apparatus 100 executes the job with the selected functions and conditions in step S10, and finishes the process.

As described above, when the image forming apparatus 100 is to execute a job while receiving the power supplied by the uninterruptible power supply system 101, the electric energy amount determination part 111 determines the amount of maximum electric energy Wm of the uninterruptible power supply system 101, the function selection part 112 selects functions based on the amount of maximum electric energy Wm, and the image forming apparatus 100 executes the job with the thus selected functions. Accordingly, the image forming apparatus 100 can efficiently use the power of the uninterruptible power supply system 101, and also, can execute the job within the range of electric energy which the uninterruptible power supply system 101 can supply, and also, under the conditions that approach those required by the job, the instruction for which has been input to the image forming apparatus 100.

It is noted that the functions of the image forming apparatus 100 according to the first embodiment described above using FIG. 3 can be realized as a result of the respective steps of operations described above using FIG. 3 being coded by a programming language suitable for the image forming apparatus 100 according to the first embodiment and the thus obtained program being executed by the CPU 210 shown in FIG. 2B. Therefore, the program for realizing the functions of the image forming apparatus 100 according to the first embodiment can be stored in the recording medium 161 (i.e., the computer readable information recording medium) shown in FIG. 2A.

Therefore, by storing the program according to the first embodiment in the recording medium 161 such as a flexible disk, a CD, a DVD or the like, it is possible to install the program into the image forming apparatus 100. Further, since the image forming apparatus 100 has the network I/F 150 as shown in FIG. 2A, the program according to the first embodiment can be downloaded via a telecommunications line such as the Internet, and be installed in the image forming apparatus 100.

Thus, according to the first embodiment, it is possible to provide a processing apparatus that can carry out a process in such a manner depending on electric energy that an uninterruptible power supply system can supply.

Although the processing apparatus, image forming apparatus, processing method and computer readable information recording medium have been described by the embodiment, the present invention is not limited to the specifically disclosed embodiment, and variations and modifications may be made without departing from the scope of the present invention.

The present application is based on and claims the benefit of priority of Japanese Priority Application No. 2012-149647 filed on Jul. 3, 2012 and Japanese Priority Application No. 2013-083538 filed on Apr. 12, 2013, the entire contents of which are hereby incorporated herein by reference.

What is claimed is:

1. A processing apparatus that an uninterruptible power supply system supplies power to and carries out a process, the processing apparatus comprising:
   an electric energy amount determination part that determines, based on a charged amount of electric energy in the uninterruptible power supply system, an amount of maximum electric energy that the uninterruptible power supply system can supply;
   a function selection part that selects, depending on the amount of maximum electric energy, functions that can be used for carrying out the process; and
   a memory that stores, for respective ones of a plurality of functions, amounts of electric energy consumptions which are respectively consumed when the plurality of functions are used,
   wherein the function selection part selects the functions for carrying out the process based on the amounts of electric energy consumptions stored by the memory.

2. The processing apparatus as claimed in claim 1, wherein the function selection part selects the functions to be used for carrying out the process in such a manner that a total of the amounts of electric energy consumptions of the selected functions is greater than or equal to an amount of minimum required electric energy required for carrying out the process and less than or equal to the amount of maximum electric energy.

3. The processing apparatus as claimed in claim 2, further comprising
   an operation part that is operated to set the amounts of electric energy consumptions stored by the memory.

4. The processing apparatus as claimed in claim 2, wherein the electric energy amount determination part determines the amount of maximum electric energy after an instruction for the process has been given and before the process is carried out.

5. The processing apparatus as claimed in claim 3, wherein the electric energy amount determination part determines the amount of maximum electric energy after an instruction for the process has been given and before the process is carried out.

6. The processing apparatus as claimed in claim 1, further comprising
   an operation part that is operated to set the amounts of electric energy consumptions stored by the memory.

7. The processing apparatus as claimed in claim 6, wherein the electric energy amount determination part determines the amount of maximum electric energy after an instruction for the process has been given and before the process is carried out.

8. The processing apparatus as claimed in claim 1, wherein the electric energy amount determination part determines the amount of maximum electric energy after an instruction for the process has been given and before the process is carried out.

9. A processing apparatus that an uninterruptible power supply system supplies power to and carries out a process, the processing apparatus comprising:
   an electric energy amount determination part that determines, based on a charged amount of electric energy in the uninterruptible power supply system, an amount of maximum electric energy that the uninterruptible power supply system can supply; and
   a function selection part that selects, depending on the amount of maximum electric energy, functions that can be used for carrying out the process,
   wherein
   the electric energy amount determination part determines the amount of maximum electric energy after an instruction for the process has been given and before the process is carried out.

10. An image forming apparatus that an uninterruptible power supply system supplies power to and carries out a process, the image forming apparatus comprising:
    an electric energy amount determination part that determines, based on a charged amount of electric energy in the uninterruptible power supply system, an amount of maximum electric energy that the uninterruptible power supply system can supply;
    a function selection part that selects, depending on the amount of maximum electric energy, functions that can be used for carrying out the process; and
    a memory that stores, for respective ones of a plurality of functions, amounts of electric energy consumptions which are respectively consumed when the plurality of functions are used,
    wherein the function selection part selects the functions for carrying out the process based on the amounts of electric energy consumptions stored by the memory.

11. A processing method of carrying out a process using power supplied by an uninterruptible power supply system, the processing method comprising:
    determining, by a processor, based on a charged amount of electric energy in the uninterruptible power supply system, an amount of maximum electric energy that the uninterruptible power supply system can supply;
    selecting, by a processor, depending on the amount of maximum electric energy, functions that can be used for carrying out the process; and
    storing, for respective ones of a plurality of functions, amounts of electric energy consumptions which are respectively consumed when the plurality of functions are used,
    wherein the selecting selects the functions for carrying out the process based on the amounts of electric energy consumptions which have been stored.

12. A non-transitory computer readable information recording medium storing a program which, when executed by one or more processors, performs the processing method claimed in claim 11.

* * * * *